US012742376B2

(12) United States Patent
Schuh et al.

(10) Patent No.: US 12,742,376 B2
(45) Date of Patent: Sep. 22, 2026

(54) ENGINE LOAD MANAGEMENT IN A HYDRAULIC FRACTURING SYSTEM USING A SLIP DEVICE

(71) Applicant: Caterpillar Inc., Peoria, IL (US)

(72) Inventors: David J Schuh, Peoria, IL (US); Jared M Kirk, Peoria, IL (US); Karuna Kumari Vutukuru, San Jose, CA (US); Rodney Dale Harms, Houston, TX (US); Todd Ryan Kabrich, Tombell, TX (US); Yuesheng He, Sugar Land, TX (US)

(73) Assignee: Caterpillar Inc., Peoria, IL (US)

( * ) Notice: Subject to any disclaimer, the term of this patent is extended or adjusted under 35 U.S.C. 154(b) by 24 days.

(21) Appl. No.: 18/963,087

(22) Filed: Nov. 27, 2024

(65) Prior Publication Data

US 2026/0146520 A1 May 28, 2026

(51) Int. Cl.
*F16H 45/02* (2006.01)
*E21B 43/26* (2006.01)
*F16H 47/08* (2006.01)

(52) U.S. Cl.
CPC ......... *E21B 43/2607* (2020.05); *F16H 47/08* (2013.01)

(58) Field of Classification Search
CPC .... F16H 45/02; F16H 2045/002; F16H 47/08; F04B 17/05; E21B 43/2607
See application file for complete search history.

(56) References Cited

U.S. PATENT DOCUMENTS 11,680,474 B2 6/2023 Cui et al.
11,788,395 B2 10/2023 Wilson
11,815,076 B2 11/2023 Morris
11,939,852 B2 3/2024 Coli et al.
2005/0222736 A1* 10/2005 Lee ...................... F16H 61/061 701/67
2008/0271966 A1* 11/2008 Simpson ................ F16H 61/62 192/3.33
2011/0118082 A1* 5/2011 Tsuzuki ................. F16H 61/62 192/3.3
2017/0363204 A1* 12/2017 Matsubara ............. F16D 48/06
2023/0258172 A1* 8/2023 Clark ................. E21B 43/2607 417/43
2023/0279762 A1 9/2023 Cui et al.
(Continued)

FOREIGN PATENT DOCUMENTS

CN 114412428 A 4/2022
CN 117514106 A 2/2024
JP H10184896 A * 7/1998

*Primary Examiner* — Ernesto A Suarez
*Assistant Examiner* — Lillian T Nguyen
(74) *Attorney, Agent, or Firm* — Foley & Lardner (DC)

(57) ABSTRACT

Some implementations described herein relate to a hydraulic fracturing pump system including a hydraulic fracturing pump, a gaseous fuel engine configured to drive the hydraulic fracturing pump, a slip device selectively coupling the hydraulic fracturing pump with the gaseous fuel engine, a gear system mechanically coupled to the hydraulic fracturing pump between the hydraulic fracturing pump and the slip device, and a controller. The controller may be configured to cause, responsive to an initiation of a gear shift for the gear system, a disengagement of the slip device, and cause, after a completion of the gear shift, a slip engagement of the slip device with increasing engagement.

20 Claims, 3 Drawing Sheets

(56) References Cited

U.S. PATENT DOCUMENTS

| | | | | |
|---|---|---|---|---|
| 2024/0026876 | A1 | 1/2024 | Peterson et al. | |
| 2024/0271514 | A1 * | 8/2024 | Damm ................ | E21B 43/2607 |
| 2024/0401453 | A1 * | 12/2024 | Damm ................ | E21B 43/2607 |

* cited by examiner

ENGINE LOAD MANAGEMENT IN A HYDRAULIC FRACTURING SYSTEM USING A SLIP DEVICE

TECHNICAL FIELD

The present disclosure relates generally to hydraulic fracturing systems and, for example, to engine load management in a hydraulic fracturing system using a slip device.

BACKGROUND

Hydraulic fracturing is a well stimulation technique that typically involves pumping hydraulic fracturing fluid into a wellbore at a rate and a pressure (e.g., up to 15,000 pounds per square inch (psi)) sufficient to form fractures in a rock formation surrounding the wellbore. This well stimulation technique often enhances the natural fracturing of a rock formation to increase the permeability of the rock formation, thereby improving recovery of water, oil, natural gas, and/or other fluids. A hydraulic fracturing pump (or a "well stimulation pump") may be powered by a diesel engine or a diesel/natural gas dual-fuel engine (e.g., a dynamic gas blending (DGB) engine), which are capable of handling high load rise rates. However, diesel engines and diesel/natural gas dual-fuel engines are associated with high levels of greenhouse gas emissions and high fuel costs.

Gaseous fuels, such as natural gas, may be less expensive than other hydrocarbon fuels, more readily available in remote areas, and may burn relatively cleaner during operation. A typical gaseous fuel internal combustion engine differs from a traditional, liquid fuel internal combustion engine primarily in that a gaseous fuel (e.g., methane, natural gas, ethane, and/or propane) is burned in the engine rather than an atomized mist of liquid fuel from a fuel injector or carburetor. Most gaseous fuel engines operate using spark ignition by a conventional spark plug. While gaseous fuel engines have a number of benefits, gaseous fuel engines are typically associated with poor load acceptance or otherwise poor response to changes in load. This is because a gaseous fuel engine may be associated with a relatively long path between cylinders of the engine and a fuel inlet to the engine, and it may take several seconds before a volume of gaseous fuel in the engine can be adjusted to a new level. In hydraulic fracturing operations, an engine may experience high transient loads from the hydraulic fracturing pumps. While the load response capability of diesel engines is suitable for handling such transient loads, in gaseous fuel engines that operate at a single speed, these high transient loads can lead to speed droop and other transient response issues.

U.S. Patent Application Publication No. 2023/0279762 (the '762 publication) discloses a fracturing apparatus that includes a plunger pump, a prime mover, a clutch, and a clutch hydraulic system. The '762 publication indicates that the clutch hydraulic system is configured to provide hydraulic oil to the clutch. The '762 publication discloses that upon a pressure sensor detecting that the pressure of the hydraulic oil provided by the clutch hydraulic system to the clutch is smaller than a preset pressure value, the fracturing apparatus may control the clutch to disengage, so that a clutch slip phenomenon caused by lower liquid pressure may be avoided. The '762 publication does not describe techniques for handling the types of high transient loads associated with hydraulic fracturing operations in systems that use gaseous fuel engines.

The hydraulic fracturing pump system of the present disclosure solves one or more of the problems set forth above and/or other problems in the art.

SUMMARY

A hydraulic fracturing system may include one or more fluid conduits, and a hydraulic fracturing pump system fluidly coupled to the one or more fluid conduits. The hydraulic fracturing pump system may include a hydraulic fracturing pump, a gaseous fuel engine configured to drive the hydraulic fracturing pump, a torque converter including an impeller clutch that selectively couples the hydraulic fracturing pump with the gaseous fuel engine, a gear system mechanically coupled to the hydraulic fracturing pump between the hydraulic fracturing pump and the torque converter, and a controller. The controller may be configured to cause, during a gear shift for the gear system, a depressurization of an impeller clutch control for the impeller clutch, and cause, after a completion of the gear shift, a slip engagement of the impeller clutch with increasing pressurization of the impeller clutch control.

Some implementations described herein relate to a hydraulic fracturing pump system including a hydraulic fracturing pump, a gaseous fuel engine configured to drive the hydraulic fracturing pump, a slip device selectively coupling the hydraulic fracturing pump with the gaseous fuel engine, a gear system mechanically coupled to the hydraulic fracturing pump between the hydraulic fracturing pump and the slip device, and a controller. The controller may be configured to cause, responsive to an initiation of a gear shift for the gear system, a disengagement of the slip device, and cause, after a completion of the gear shift, a slip engagement of the slip device with increasing engagement.

Some examples described herein relate to a method of load management for a gaseous fuel engine selectively coupled to a hydraulic fracturing pump by a slip device. The method may include detecting, by a controller, an initiation of a gear shift for a gear system mechanically coupled to the hydraulic fracturing pump between the hydraulic fracturing pump and the slip device. The method may include causing, by the controller and responsive to the initiation of the gear shift, a disengagement of the slip device. The method may include detecting, by the controller, a completion of the gear shift. The method may include causing, by the controller and after the completion of the gear shift, a slip engagement of the slip device with increasing engagement.

DETAILED DESCRIPTION

This disclosure relates to a hydraulic fracturing pump system, which is applicable to any hydraulic fracturing system or other system that pressurizes fluids.

Figure 1:
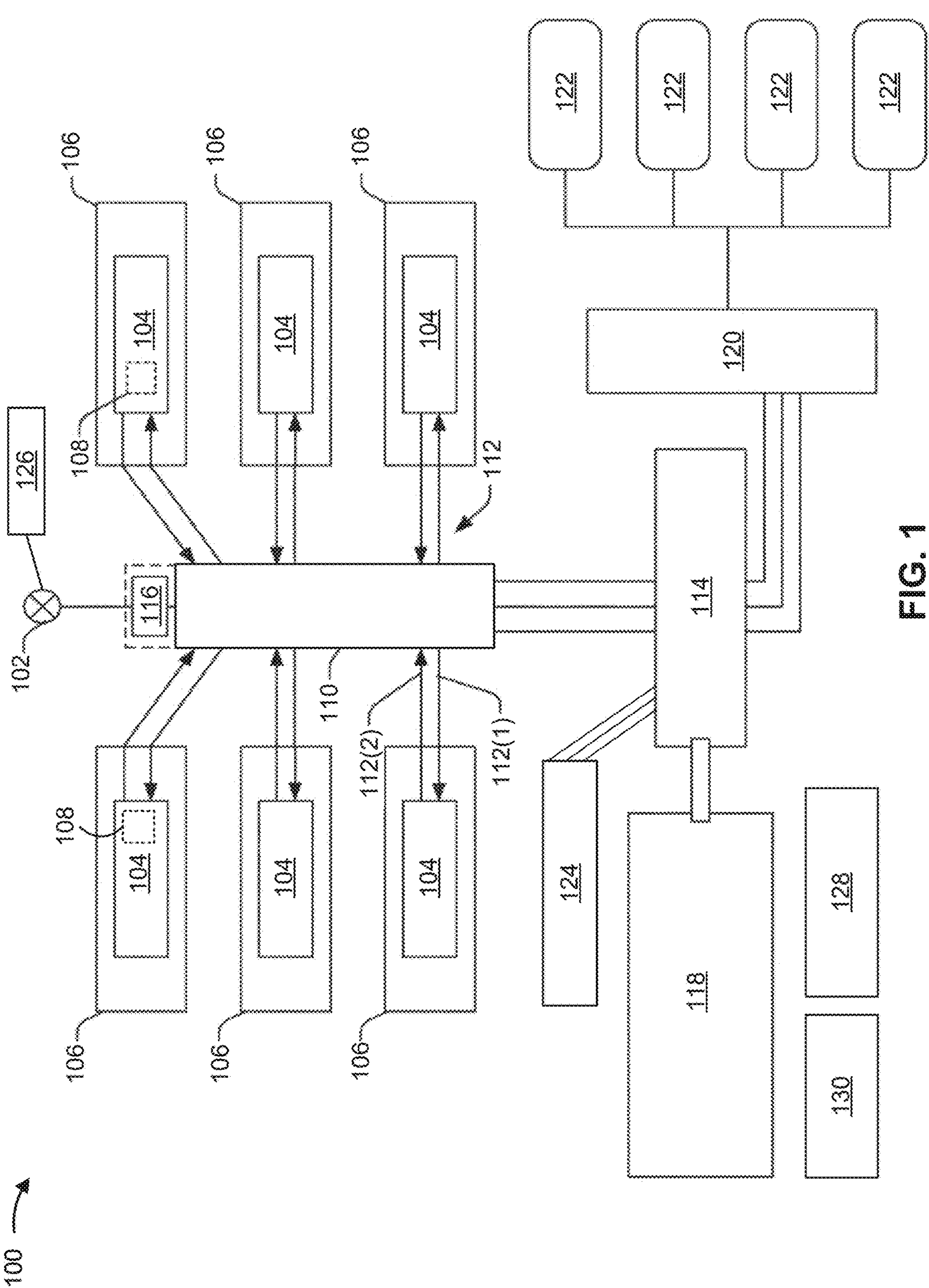
FIG. 1 is a diagram illustrating an example hydraulic fracturing system.

FIG. 1 is a diagram illustrating an example hydraulic fracturing system 100. For example, FIG. 1 depicts a plan view of an example hydraulic fracturing site along with equipment that is used during a hydraulic fracturing process. In some examples, less equipment, additional equipment, or alternative equipment to the example equipment depicted in FIG. 1 may be used to conduct the hydraulic fracturing process.

The hydraulic fracturing system 100 includes a well 102. Hydraulic fracturing is a well-stimulation technique that uses high-pressure injection of fracturing fluid into the well 102 and corresponding wellbore in order to hydraulically fracture a rock formation surrounding the wellbore. While the description provided herein describes hydraulic fracturing in the context of wellbore stimulation for oil and gas production, the description herein is also applicable to other uses of hydraulic fracturing.

High-pressure injection of the fracturing fluid may be achieved by one or more pump systems 104 (e.g., hydraulic fracturing pump systems) that may be mounted (or housed) on one or more hydraulic fracturing trailers 106 (which also may be referred to as "hydraulic fracturing rigs") of the hydraulic fracturing system 100. Each of the pump systems 104 includes at least one fluid pump 108 (referred to herein collectively, as "fluid pumps 108" and individually as "a fluid pump 108"). The fluid pumps 108 may be hydraulic fracturing pumps. The fluid pumps 108 may include various types of high-volume hydraulic fracturing pumps, such as triplex or quintuplex pumps. Additionally, or alternatively, the fluid pumps 108 may include other types of reciprocating positive-displacement pumps or gear pumps. A type and/or a configuration of the fluid pumps 108 may vary depending on the fracture gradient of the rock formation that will be hydraulically fractured, the quantity of fluid pumps 108 used in the hydraulic fracturing system 100, the flow rate necessary to complete the hydraulic fracture, the pressure necessary to complete the hydraulic fracture, or the like. The hydraulic fracturing system 100 may include any number of trailers 106 having fluid pumps 108 thereon in order to pump hydraulic fracturing fluid at a predetermined rate and pressure.

In some examples, the fluid pumps 108 may be in fluid communication with a manifold 110 via various fluid conduits 112, such as flow lines, pipes, or other types of fluid conduits. The manifold 110 combines fracturing fluid received from the fluid pumps 108 prior to injecting the fracturing fluid into the well 102. The manifold 110 also distributes fracturing fluid to the fluid pumps 108 that the manifold 110 receives from a blender 114 of the hydraulic fracturing system 100. In some examples, the various fluids are transferred between the various components of the hydraulic fracturing system 100 via the fluid conduits 112. The fluid conduits 112 include low-pressure fluid conduits 112(1) and high-pressure fluid conduits 112(2). In some examples, the low-pressure fluid conduits 112(1) deliver fracturing fluid from the manifold 110 to the fluid pumps 108, and the high-pressure fluid conduits 112(2) transfer high-pressure fracturing fluid from the fluid pumps 108 to the manifold 110.

The manifold 110 also includes a fracturing head 116. The fracturing head 116 may be included on a same support structure as the manifold 110. The fracturing head 116 receives fracturing fluid from the manifold 110 and delivers the fracturing fluid to the well 102 (via a well head mounted on the well 102) during a hydraulic fracturing process. In some examples, the fracturing head 116 may be fluidly connected to multiple wells.

The blender 114 combines proppant received from a proppant storage unit 118 with fluid received from a hydration unit 120 of the hydraulic fracturing system 100. In some examples, the proppant storage unit 118 may include a dump truck, a truck with a trailer, one or more silos, or other types of containers. The hydration unit 120 receives water from one or more water tanks 122. In some examples, the hydraulic fracturing system 100 may receive water from water pits, water trucks, water lines, and/or any other suitable source of water. The hydration unit 120 may include one or more tanks, pumps, gates, or the like.

The hydration unit 120 may add fluid additives, such as polymers or other chemical additives, to the water. Such additives may increase the viscosity of the fracturing fluid prior to mixing the fluid with proppant in the blender 114. The additives may also modify a pH of the fracturing fluid to an appropriate level for injection into a targeted formation surrounding the wellbore. Additionally, or alternatively, the hydraulic fracturing system 100 may include one or more fluid additive storage units 124 that store fluid additives. The fluid additive storage unit 124 may be in fluid communication with the hydration unit 120 and/or the blender 114 to add fluid additives to the fracturing fluid.

In some examples, the hydraulic fracturing system 100 may include a balancing pump 126. The balancing pump 126 provides balancing of a differential pressure in an annulus of the well 102. The hydraulic fracturing system 100 may include a data monitoring system 128. The data monitoring system 128 may manage and/or monitor the hydraulic fracturing process performed by the hydraulic fracturing system 100 and the equipment used in the process. In some examples, the management and/or monitoring operations may be performed from multiple locations. The data monitoring system 128 may be supported on a van, a truck, or may be otherwise mobile. The data monitoring system 128 may include a display for displaying data for monitoring performance and/or optimizing operation of the hydraulic fracturing system 100. In some examples, the data gathered by the data monitoring system 128 may be sent off-board or off-site for monitoring performance and/or performing calculations relative to the hydraulic fracturing system 100.

The hydraulic fracturing system 100 includes a controller 130. The controller 130 may be a system-wide controller for the hydraulic fracturing system 100 or a pump-specific controller for a pump system 104. The controller 130 may be communicatively coupled (e.g., by a wired connection or a wireless connection) with one or more of the pump systems 104. The controller 130 may also be communicatively coupled with other equipment and/or systems of the hydraulic fracturing system 100.

As indicated above, FIG. 1 is provided as an example. Other examples may differ from what is described with regard to FIG. 1.

Figure 2:
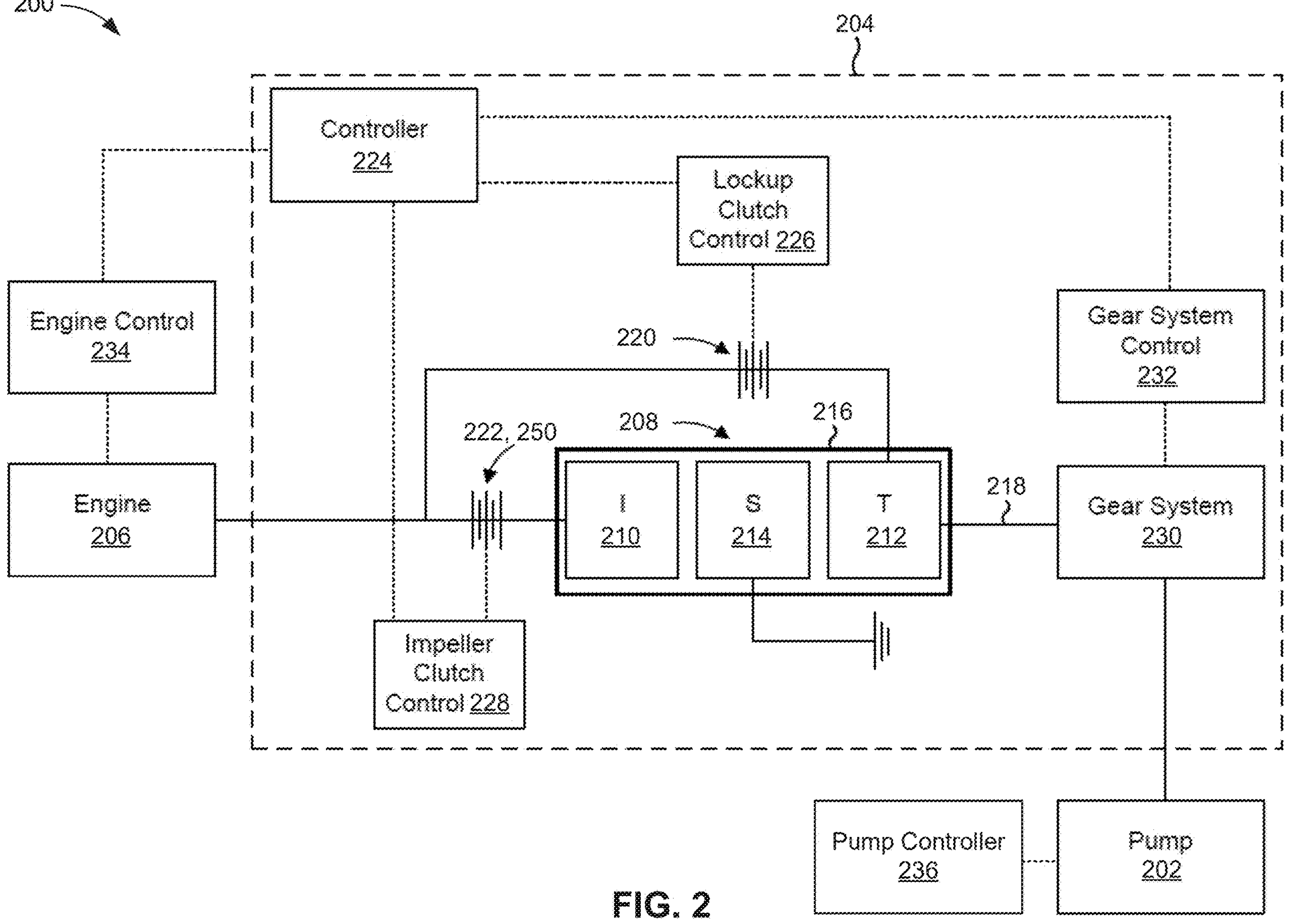
FIG. 2 is a diagram illustrating an example pump system.

FIG. 2 is a diagram illustrating an example pump system 200. The pump system 200 may correspond to a pump system 104, described herein. The pump system 200 includes a powertrain that includes a pump 202, a transmission system 204, and an engine 206. The transmission system 204 may include a torque converter 208 and a gear system 230 (e.g., a planetary gear system).

The pump 202 may be a hydraulic fracturing pump. For example, the pump 202 may correspond to a fluid pump 108, described herein. The gear system 230 is mechanically coupled to the pump 202. The gear system 230 provides multiple gear ratios (or "gears") to allow driving of the pump 202 at various speeds and torques. The transmission system 204 may be a type of automatic transmission. The engine 206 may be a gaseous fuel engine (e.g., an engine operable by spark ignition of a gaseous fuel). The engine 206 may include a crankshaft (not shown), configured for rotation in the engine 206 to rotate a flywheel (not shown). The engine

206 is configured to drive (e.g., provide power to) the pump 202 via the transmission system 204.

The torque converter 208 (e.g., a fluid coupling device) is configured to fluidly couple the engine 206 and the gear system 230. The torque converter 208 includes an impeller 210 (shown as "I" in FIG. 2), a turbine 212 (shown as "T" in FIG. 2), and a stator 214 (shown as "S" in FIG. 2), positioned between the impeller 210 and the turbine 212, within a housing 216. The housing 216 is filled with a fluid (e.g., transmission fluid). In operation, a toroidal fluid flow circuit is created by the impeller 210, the turbine 212, and the stator 214.

The housing 216 is mechanically coupled to the engine 206. For example, the housing 216 may be mechanically coupled to (e.g., mounted on) the flywheel of the engine 206. The turbine 212 is mechanically coupled to the gear system 230. For example, the turbine 212 may be operatively coupled to an output shaft 218 (which may also be referred to as a "transmission input shaft") that is coupled to the gear system 230.

Operation of the engine 206 rotates the housing 216, and the housing 216 transfers rotational forces to the impeller 210 (e.g., which may be coupled to an interior surface of the housing 216). The impeller 210 includes an array of blades that directs fluid toward the turbine 212 in response to rotation of the impeller 210. The turbine 212 is fluidly coupled to the impeller 210. For example, the turbine 212 is hydrodynamically coupled to the impeller 210 so that rotation of the impeller 210 drives the turbine 212. Thus, fluid pumped by the impeller 210 rotates the turbine 212, thereby transferring torque from the engine 206 to the gear system 230. The turbine 212 also includes an array of blades that directs fluid toward the impeller 210 in response to rotation of the turbine 212. The stator 214, positioned between the impeller 210 and the turbine 212, redirects fluid exiting from the turbine 212 toward the impeller 210. The stator 214 also includes an array of blades configured to control a direction of fluid flow exiting from the turbine 212 to align with a direction of the fluid flow with respect to the impeller 210, which produces a torque multiplication effect when the engine 206 is operating at a low speed (e.g., when a speed of the engine 206 is less than a speed of the pump 202). The stator 214 may be restricted against rotating in an opposite direction of the fluid flow (e.g., via a one-way clutch).

The torque converter 208 includes a lockup clutch 220 and an impeller clutch 222. In some implementations, the gear system 230 and the torque converter 208 (including the lockup clutch 220 and the impeller clutch 222) may be housed together.

The lockup clutch 220 is configured to mechanically couple (e.g., selectively) the engine 206 and the gear system 230 (e.g., via the torque converter 208 without fluid coupling). For example, the lockup clutch 220 may be configured to mechanically couple the turbine 212 to the engine 206. The lockup clutch 220 may be located in the housing 216 (e.g., between the turbine 212 and an interior surface of the housing 216). The lockup clutch 220 may be configured to couple the turbine 212 to the housing 216, such that the housing 216 transfers rotational forces to the turbine 212 during operation of the engine 206. The lockup clutch 220 may be a friction clutch.

The lockup clutch 220 is configured to transition between a disengaged state and an engaged state (e.g., by hydraulic control of the lockup clutch 220). The lockup clutch 220 may be slipped (e.g., partially engaged) when transitioning between engagement and disengagement or between disengagement and engagement. Disengagement of the lockup clutch 220 results in fluid coupling of the engine 206 and the gear system 230 via the torque converter 208. Engagement of the lockup clutch results in mechanical coupling of the engine 206 and the gear system 230 via the torque converter 208. The lockup clutch 220 may be engaged when a speed of the turbine 212 corresponds to (e.g., is substantially the same as) a speed of the impeller 210. Mechanical coupling of the engine 206 and the gear system 230 more efficiently transfers power from the engine 206 to the gear system 230 relative to fluid coupling.

The impeller clutch 222 may be configured to mechanically couple (e.g., selectively) the impeller 210 to the engine 206. The impeller clutch 222 may be located in the housing 216 (e.g., between the impeller 210 and an interior surface of the housing 216). The impeller clutch 222 may be configured to couple the impeller 210 to the housing 216, such that the housing 216 transfers rotational forces to the impeller 210 during operation of the engine 206. The impeller clutch 222 may be a friction clutch. In some implementations, the impeller clutch 222 may include a disc stack of alternating friction discs and separator plates. A piston plate may be positioned on an end of the disc stack. One or more actuators (e.g., hydraulically actuated pistons) may be configured to engage the piston plate to compress the disc stack.

The impeller clutch 222 is configured to transition between a disengaged state and an engaged state (e.g., by hydraulic control of the impeller clutch 222). In some examples, the impeller clutch 222 may have a slip engagement that partially engages the engine 206 and the impeller 210. Disengagement of the impeller clutch 222 results in decoupling of the engine 206 and the gear system 230 (e.g., decoupling of the engine 206 and the impeller 210). Engagement of the impeller clutch 222 results in fluid coupling of the engine 206 and the gear system 230 via the torque converter 208 (e.g., coupling of the engine 206 and the impeller 210). Slipping the impeller clutch 222 partially engages the engine 206 to the pump 202.

Accordingly, the impeller clutch 222 is a slip device 250 of the transmission system 204. For example, the slip device 250 may provide selective coupling (e.g., engagement, disengagement, or a slip engagement) between the engine 206 and the pump 202. Thus, the gear system 230 may be mechanically coupled to the pump 202 between the pump 202 and the slip device 250. In some implementations, the slip device 250 may be another device capable of providing a slip engagement between the engine 206 and the pump 202. For example, the slip device 250 may be a parallel path variable (PPV) transmission, which may be positioned between the engine 206 and the torque converter 208, or may be used in place of the torque converter 208 (the torque converter 208 may be eliminated).

The pump system 200 may include a controller 224. The controller 224 may include one or more electronic control modules (ECMs) associated with the engine 206, the transmission system 204, the gear system 230, and/or the torque converter 208. For example, the controller 224 may be associated with the transmission system 204, as shown. The controller 224 may correspond to the controller 130, described herein. Moreover, the transmission system 204 may include a gear system control 232 for the gear system 230, and the pump system 200 may include an engine control 234 for the engine 206. The gear system control 232 and the engine control 234 may be communicatively coupled with the controller 224.

The controller 224 may include one or more memories and one or more processors communicatively coupled to the one or more memories. A processor may include a central processing unit, a graphics processing unit, a microprocessor, a controller, a microcontroller, a digital signal processor, a field-programmable gate array, an application-specific integrated circuit, and/or another type of processing component. The processor may be implemented in hardware, firmware, or a combination of hardware and software. The processor may be capable of being programmed to perform one or more operations or processes described elsewhere herein. A memory may include volatile and/or nonvolatile memory. For example, the memory may include random access memory (RAM), read only memory (ROM), a hard disk drive, and/or another type of memory (e.g., a flash memory, a magnetic memory, and/or an optical memory). The memory may store information, one or more instructions, and/or software (e.g., one or more software applications) related to the operation of the controller 224.

The controller 224 may be configured to control engagement and disengagement of the lockup clutch 220 and/or the impeller clutch 222. The controller 224 may control engagement and disengagement of the lockup clutch 220 via a first clutch control 226 and/or the controller 224 may control engagement and disengagement of the impeller clutch 222 via a second clutch control 228. The clutch controls 226, 228 may include hydraulic actuators, valves, or the like. For example, the clutch controls 226, 228 may include electronic clutch pressure controls (ECPCs) or other electronically controlled hydraulic valves.

The controller 224 may be configured to perform load management operations for the engine 206. For example, gear shifts performed while the pump 202 is operating may produce transient loads on the engine 206. In connection with a hydraulic fracturing operation, the controller 224 may detect an initiation of a gear shift for the gear system 230. For example, the controller 224 may receive a command (e.g., an operator command) to perform the gear shift (e.g., where the command indicates the initiation of the gear shift). The command may indicate a current gear ratio and/or a desired gear ratio for the gear shift. The controller 224 may receive the command as an operator input, from the pump controller 236, from the engine control 234, or from another controller. In some examples, the controller 224 may detect the initiation of the gear shift through monitoring of the gear system 230 (e.g., using one or more sensors connected to the gear system 230, such as connected to clutches of the gear system 230). In some examples, the controller 224 may detect, or predict, another type of transient load event.

The gear shift may be a shift between forward gear ratios of the gear system 230. For example, the gear shift may be an upshift. In some examples, the gear shift may be a shift from neutral (e.g., into a forward gear ratio of the gear system 230). The controller 224 may determine whether control of the slip device 250, as described herein, may be employed for the gear shift based on the gear ratios implicated by the gear shift (e.g., the determination is on a per-shift basis). For example, control of the slip device 250 may be employed if the gear shift is an upshift between sequential gears.

Responsive to the initiation of the gear shift (e.g., based on a determination that control of the slip device 250 may be employed for the gear shift), the controller 224 may cause a disengagement of the slip device 250. For example, the controller 224 may cause the disengagement of the slip device 250 during the gear shift (e.g., after the gear shift has started, while the gear shift is ongoing, or the like). The disengagement of the slip device 250 may refer to a reduction in a degree of engagement of the slip device 250, and may include a full disengagement of the slip device 250 or a partial disengagement of the slip device 250. Thus, the disengagement of the slip device 250 may result in a decrease in speed across the slip device 250. In some examples, the controller 224 may cause the disengagement of the slip device 250 responsive to detecting, or predicting, another type of transient load event.

In some examples, to cause the disengagement of the slip device 250, the controller 224 may cause adjustment of a pressurization of the impeller clutch control 228 for the impeller clutch 222 (e.g., to unlock the impeller clutch 222). For example, the controller 224 may cause a reduction of a pressurization of the impeller clutch control 228 for the impeller clutch 222. As an example, the controller 224 may cause a depressurization of the impeller clutch control 228 for the impeller clutch 222. In particular, the controller 224 may send a control signal to the impeller clutch control 228 that commands a particular pressure for unlocking the impeller clutch 222.

The pressure applied to the impeller clutch 222 may be adjusted to a level that is based on an input torque of the gear system 230. For example, the higher the input torque, the lower the pressure level that is applied to the impeller clutch 222. As an example, for lower input torques (e.g., torques less than a threshold), the pressure may be greater than 0 psi (e.g., the impeller clutch 222 can be unlocked without reducing pressure to zero psi), and for greater input torques (e.g., torques greater than the threshold), the pressure may be 0 psi (e.g., the impeller clutch 222 can be unlocked by reducing the pressure to 0 psi). The controller 224 may determine the pressure for the impeller clutch 222, based on the input torque, using a table, a mapping, or the like.

Disengaging the slip device 250 during the gear shift unloads the pump 202 from the engine 206, thereby facilitating gradual loading of the engine 206 that minimizes speed droop and other transient response issues. After the slip device 250 has been disengaged, the controller 224 may detect a completion of the gear shift. For example, the controller 224 may obtain (e.g., receive) an indication of the completion of the gear shift (e.g., from the gear system control 232). The indication may indicate that a current gear ratio of the gear system 230 is the desired gear ratio of the gear shift, thereby indicating completion of the gear shift. In some examples, the controller 224 may use a time-based approach to detect the completion of the gear shift. For example, responsive to detecting the initiation of the gear shift, the controller 224 may initiate a timer, and responsive to expiration of the timer, the controller 224 may determine that the gear shift is complete. In some examples, responsive to obtaining the indication of the completion of the gear shift, the controller 224 may initiate a timer, and responsive to expiration of the timer (e.g., which provides additional time for the gear shift to ring in), the controller 224 may determine that the gear shift is complete. In some examples, the controller 224 may detect the completion of the gear shift through monitoring of the gear system 230 (e.g., using one or more sensors connected to the gear system 230, such as connected to clutches of the gear system 230).

After completion of the gear shift (e.g., after the controller 224 detects completion of the gear shift), the controller 224 may cause a slip engagement of the slip device 250. For example, the controller 224 may cause the slip engagement of the slip device 250 after a time delay following obtaining an indication of the completion of the gear shift. As an example, upon obtaining the indication of the completion of the gear shift, the controller 224 may initiate a timer (e.g., providing an additional delay to allow the gear shift to fully complete), and the controller 224 may cause the slip engagement of the slip device 250 after an expiration of the timer. In some examples, the controller 224 may cause the slip engagement of the slip device 250 responsive to detecting a completion of another type of transient load event.

The controller 224 may cause the slip engagement with an increasing amount of engagement of the slip device 250. The slip engagement may result in a decrease in speed across the slip device 250, and the increasing engagement of the slip device 250 may gradually minimize the decrease in speed across the slip device 250. As an example, the controller 224 may cause the slip engagement of the slip device with increasing engagement in order to reach full engagement of the slip device 250. Full engagement of the slip device 250 may result in no decrease in speed across the slip device 250.

In some examples, to cause the slip engagement of the slip device 250 with increasing engagement, the controller 224 may cause increasing pressurization of the impeller clutch control 228 for the impeller clutch 222. The controller 224 may cause increasing of the pressurization until the impeller clutch 222 is fully engaged (e.g., to lock the impeller clutch 222). For example, the controller 224 may cause increasing of the pressurization at a ramp rate that is based on a torque output of the gear system 230 and a speed of the impeller 210 (e.g., using a table, a mapping, or the like). The ramp rate may be in pressure increments (e.g., such that the pressure is increased by the increment per controller loop). As an example, the increment may be greater for higher impeller speeds and lower for lower impeller speeds. Moreover, at lower torque outputs, the increment may have smaller increases with impeller speed increases, and at higher torque outputs, the increment may have larger increases with impeller speed increases.

To cause increasing of the pressurization, the controller 224 may transmit one or more pressure commands to the impeller clutch control 228 (e.g., an ECPC). For example, the controller 224 may send a series of control signals to the impeller clutch control 228 each commanding a higher pressure than a previous control signal. As an example, the controller 224 may determine a first pressure in accordance with the ramp rate, and may send a first control signal to the impeller clutch control 228 commanding the first pressure, may determine a second pressure in accordance with the ramp rate, and may send a second control signal to the impeller clutch control 228 commanding the second pressure, and so forth, until locking of the impeller clutch 222.

In some examples, the controller 224 may cause, prior to the completion of the gear shift, the slip engagement of the slip device 250 with increasing engagement in accordance with a first engagement rate (e.g., the controller 224 may cause pressurization of the impeller clutch control 228 of the impeller clutch 222 at a first ramp rate), and the controller 224 may cause, after the completion of the gear shift, the slip engagement of the slip device 250 with increasing engagement in accordance with a second engagement rate (e.g., the controller 224 may cause pressurization of the impeller clutch control 228 of the impeller clutch 222 at a second ramp rate). For example, responsive to the disengagement of the slip device 250, the controller 224 may initiate a timer. During the timer, the controller 224 may cause the slip engagement of the slip device 250 with increasing engagement in accordance with the first engagement rate (e.g., that more slowly engages the slip device 250). Upon an expiration of the timer (e.g., allowing the gear shift time to fully ring in), the controller 224 may cause the slip engagement of the slip device 250 with increasing engagement in accordance with the second engagement rate (e.g., that more quickly engages the slip device 250).

In some examples, after the completion of the gear shift, the controller 224 may cause, during a time window, the slip engagement of the slip device 250 with increasing engagement in accordance with a first engagement rate, and after the time window, the controller 224 may cause the slip engagement of the slip device 250 with increasing engagement in accordance with a second engagement rate. For example, responsive to initiating the slip engagement of the slip device 250, the controller 224 may initiate a timer. During the timer, the controller 224 may cause the slip engagement of the slip device 250 with increasing engagement in accordance with the first engagement rate (e.g., that more slowly engages the slip device 250). Upon an expiration of the timer (e.g., full engagement is taking too long), the controller 224 may cause the slip engagement of the slip device 250 with increasing engagement in accordance with the second engagement rate (e.g., that more quickly engages the slip device 250).

By using the slip engagement of the slip device 250 and gradually increasing engagement, transient load changes can be better accepted by the engine 206. Moreover, unlocking of the impeller clutch 222 during the gear shift may assist in mitigating impeller clutch power and energy, thereby reducing overheating of the impeller clutch 222.

As indicated above, FIG. 2 is provided as an example. Other examples may differ from what is described with regard to FIG. 2.

Figure 3:
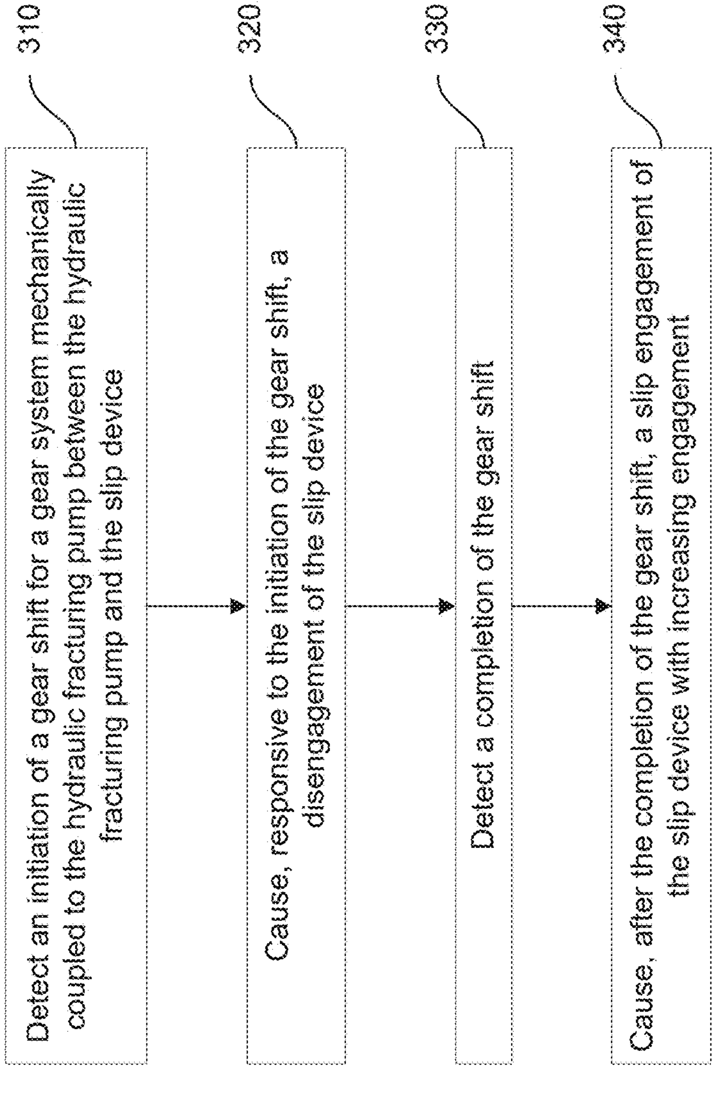
FIG. 3 is a flowchart of an example process associated with engine load management in a hydraulic fracturing system using a slip device.

FIG. 3 is a flowchart of an example process 300 associated with engine load management in a hydraulic fracturing system using a slip device. One or more steps of process 300 may be performed by the controller 224, alone or in combination with one or more additional controllers (e.g., controller 130 and/or pump controller 236). Additionally, or alternatively, one or more steps of process 300 may be performed by another device or a group of devices separate from or including the controller 224, such as another device or component that is internal or external to the pump system 200.

At step 310, process 300 may include detecting an initiation of a gear shift for the gear system 230 mechanically coupled to the hydraulic fracturing pump 202 between the hydraulic fracturing pump 202 and the slip device 250. As described herein, the controller 224 may detect the initiation of the gear shift, such as by receiving a command to perform the gear shift (e.g., a gear ratio is commanded by shift control logic). At the initiation of gear shift, the controller 224 may cause the input torque of the gear system 230 to be latched.

At step 320, process 300 may include causing, responsive to the initiation of the gear shift, a disengagement of the slip device 250. As described herein, to cause the disengagement of the slip device 250, the controller 224 may cause unlocking of the impeller clutch 222. The controller 224 may use a lookup table to identify an unlock pressure for the impeller clutch 222. The unlock pressure may be speed-compensated to account for changes in torus pressure inside the torque converter 208. Thus, once the gear shift is in progress, the controller 224 may cause the pressure for the impeller clutch control 228 for the impeller clutch 222 to be dropped to the calculated unlock pressure. As one example, for a gear shift from neutral to a forward gear ratio, the controller 224 may command a minimum unlock pressure (e.g., 0 psi) for the impeller clutch control 228 for the impeller clutch 222.

The controller 224 may determine an unlock duration for the impeller clutch 222 based on a current gear and a desired gear for the gear shift (e.g., using a table, a mapping, or the like). The controller 224 may hold the impeller clutch 222 in a slip-possible state until an expiration of the unlock duration, or otherwise until the lockup clutch 220 is engaged and/or an impeller speed ratio satisfies a threshold.

At step 330, process 300 may include detecting a completion of the gear shift. For example, the controller 224 may maintain the impeller clutch 222 unlocked until the gear shift is complete. The gear shift may be complete when all clutches of the gear system 230 reach a clamp and sustain state. In one example, the controller 224 may wait for a delay period while the gear shift completes (e.g., a shift control logic indicates that an actual gear ratio of the gear system 230 is the desired gear ratio of the gear shift) plus an additional waiting time to allow time for the gear shift to ring in.

At step 340, process 300 may include causing, after the completion of the gear shift, a slip engagement of the slip device 250 with increasing engagement. As described herein, the controller 224 may cause slip engagement of the impeller clutch 222 at a pressure ramp rate for the impeller clutch control 228 (e.g., indicated by a table, a mapping, or the like) to drive the impeller clutch 222 back to its top pressure. In some implementations, the controller 224 may initiate a timer when the pressure of the impeller clutch 222 is dropped to the unlock pressure. While the timer is running, the controller 224 may cause the pressurization of the impeller clutch control 228 for the impeller clutch 222 at a first ramp rate. In some implementations, this first ramp rate may be 0 psi (i.e., there is no ramping of pressure while the timer is running) or a relatively low ramp rate. After an expiration of the timer, the controller 224 may cause the pressurization of the impeller clutch control 228 for the impeller clutch 222 at a second ramp rate (e.g., the ramp rate indicated by the table, the mapping, or the like) until a commanded pressure for the impeller clutch 222 reaches an engage pressure.

As one example, for a gear shift from neutral to a forward gear ratio, once the actual gear of the gear system 230 becomes the forward gear ratio, the controller 224 may cause ramping of the pressure of the impeller clutch control 228 for the impeller clutch 222 at a ramp rate, which may be a map-based parameter based on a calculated gear system input torque and an impeller relative speed. For example, the controller 224 may begin ramping the pressure to the impeller clutch control 228 for the impeller clutch 222 at the ramp rate (e.g., identified from a table, a mapping, or the like) until reaching an impeller engage pressure or until an impeller speed ratio satisfies a threshold (e.g., a speed ratio greater than the threshold). In this way, the slip engagement of the impeller clutch 222 may provide feathering-in of the pump load to the engine 206. In some examples, if the impeller engage pressure is not achieved within a time window after initiation of the pressure ramping, or if a different gear ratio is commanded, the controller 224 may cause the pressure of the impeller clutch control 228 for the impeller clutch 222 to increase at a greater ramp rate.

Although FIG. 3 shows example steps of process 300, in some implementations, process 300 may include additional steps, fewer steps, different steps, or differently arranged steps than those depicted in FIG. 3. Additionally, or alternatively, two or more of the steps of process 300 may be performed in parallel.

INDUSTRIAL APPLICABILITY

The pump system 200 described herein may be used with any hydraulic fracturing system or other system that pressurizes fluids. The pump system 200 may be used for recovery of water, oil, natural gas, and/or other fluids from a rock formation. The pump system 200 may employ a gaseous fuel engine, and enables the use thereof in hydraulic fracturing operations. Generally, in hydraulic fracturing applications, a gaseous fuel engine is used to power a generator, which in turn powers an electric motor used to drive a hydraulic fracturing pump. However, in the pump system 200, the gaseous fuel engine is mechanically coupled to a hydraulic fracturing pump. Unlike diesel engines, gaseous fuel engines in this type of mechanical configuration, generally have poor load acceptance and poor response to changes in load.

The pump system 200 described herein enables improved transient load acceptance. For example, by slipping the slip device 250 (e.g., the impeller clutch 222) during transient events, such as gear shifts, pump load can be gradually applied to the gaseous fuel engine. In this way, speed droop and other transient response issues can be minimized.

What is claimed is:

1. A hydraulic fracturing system, comprising:
- one or more fluid conduits; and
- a hydraulic fracturing pump system fluidly coupled to the one or more fluid conduits, the hydraulic fracturing pump system comprising:
  - a hydraulic fracturing pump;
  - a gaseous fuel engine configured to drive the hydraulic fracturing pump;
  - a torque converter comprising an impeller clutch that selectively couples the hydraulic fracturing pump with the gaseous fuel engine;
  - a gear system mechanically coupled between the hydraulic fracturing pump and the torque converter; and
  - a controller configured to:
    - cause, during a gear shift for the gear system, a depressurization of an impeller clutch control for the impeller clutch;
    - obtain an indication of a completion of the gear shift; and
    - cause, after a time delay following obtaining the indication of the completion of the gear shift, a slip engagement of the impeller clutch with increasing pressurization of the impeller clutch control.

2. The hydraulic fracturing system of claim 1, wherein the controller, to cause the slip engagement of the impeller clutch with increasing pressurization, is configured to:
- cause increasing of the pressurization of the impeller clutch control at a ramp rate that is based on a torque output of the gear system and a speed of an impeller of the torque converter.

3. The hydraulic fracturing system of claim 1, wherein the controller is further configured to:
- cause, prior to the completion of the gear shift, the slip engagement of the impeller clutch with increasing engagement in accordance with a first engagement rate, and
- wherein the controller, to cause, after the time delay following obtaining the indication of the completion of the gear shift, the slip engagement of the impeller clutch, is configured to:
- cause, after the time delay following obtaining the indication of the completion of the gear shift, the slip engagement of the impeller clutch with increasing engagement in accordance with a second engagement rate.

4. A hydraulic fracturing pump system, comprising:
a hydraulic fracturing pump;
a gaseous fuel engine configured to drive the hydraulic fracturing pump;
a slip device selectively coupling the hydraulic fracturing pump with the gaseous fuel engine;
a gear system mechanically coupled between the hydraulic fracturing pump and the slip device; and
a controller configured to:
cause, responsive to an initiation of a gear shift for the gear system, a disengagement of the slip device;
obtain an indication of a completion of the gear shift; and
cause a slip engagement of the slip device with increasing engagement after a time delay following obtaining the indication of the completion of the gear shift.

5. The hydraulic fracturing pump system of claim 4, wherein the slip device is an impeller clutch of an impeller of a torque converter.

6. The hydraulic fracturing pump system of claim 5, wherein the controller, to cause the disengagement of the slip device, is configured to:
cause adjustment of a pressurization of an impeller clutch control for the impeller clutch to a level that is based on an input torque of the gear system.

7. The hydraulic fracturing pump system of claim 5, wherein the controller, to cause the slip engagement of the slip device with increasing engagement, is configured to:
cause increasing of a pressurization of an impeller clutch control for the impeller clutch at a ramp rate that is based on a torque output of the gear system and a speed of the impeller.

8. The hydraulic fracturing pump system of claim 7, wherein the controller, to cause increasing of the pressurization of the impeller clutch control, is configured to:
transmit one or more pressure commands to the impeller clutch control.

9. The hydraulic fracturing pump system of claim 4, wherein the controller is further configured to:
receive a command to perform the gear shift,
wherein the command indicates the initiation of the gear shift.

10. The hydraulic fracturing pump system of claim 4, wherein the controller is further configured to:
cause, prior to the completion of the gear shift, the slip engagement of the slip device with increasing engagement in accordance with a first engagement rate, and
wherein the controller, to cause the slip engagement of the slip device with increasing engagement after the time delay following obtaining the indication of the completion of the gear shift, is configured to:
cause the slip engagement of the slip device with increasing engagement in accordance with a second engagement rate after the time delay following obtaining the indication of the completion of the gear shift.

11. The hydraulic fracturing pump system of claim 4, wherein the controller, to cause the slip engagement of the slip device with increasing engagement, is configured to:
cause the slip engagement of the slip device with increasing engagement to reach full engagement of the slip device.

12. The hydraulic fracturing pump system of claim 4, wherein the controller, to cause the slip engagement of the slip device with increasing engagement, is configured to:
cause, during a time window, the slip engagement of the slip device with increasing engagement in accordance with a first engagement rate; and
cause, after the time window, the slip engagement of the slip device with increasing engagement in accordance with a second engagement rate.

13. A method of load management for a gaseous fuel engine selectively coupled to a hydraulic fracturing pump by a slip device, comprising:
detecting, by a controller, an initiation of a gear shift for a gear system mechanically coupled between the hydraulic fracturing pump and the slip device;
causing, by the controller and responsive to the initiation of the gear shift, a disengagement of the slip device;
detecting, by the controller, a completion of the gear shift; and
causing a slip engagement of the slip device with increasing engagement after a time delay following detecting the completion of the gear shift.

14. The method of claim 13, wherein detecting the initiation of the gear shift comprises:
receiving a command to perform the gear shift.

15. The method of claim 13, wherein detecting the completion of the gear shift comprises:
obtaining, from a gear system control, an indication of the completion of the gear shift.

16. The method of claim 13, wherein the slip device is an impeller clutch of an impeller of a torque converter, and
wherein causing the disengagement of the slip device comprises:
causing reduction of a pressurization of an impeller clutch control for the impeller clutch.

17. The method of claim 16, wherein causing the slip engagement of the slip device with increasing engagement comprises:
causing increasing of the pressurization of the impeller clutch control for the impeller clutch.

18. The method of claim 17, wherein causing increasing of the pressurization of the impeller clutch control comprises:
causing increasing of the pressurization of the impeller clutch control at a ramp rate that is based on a torque output of the gear system and a speed of the impeller.

19. The method of claim 13, wherein causing the slip engagement of the slip device with increasing engagement comprises:
causing, during a time window, the slip engagement of the slip device with increasing engagement in accordance with a first engagement rate; and
causing, after the time window, the slip engagement of the slip device with increasing engagement in accordance with a second engagement rate.

20. The method of claim 13, wherein the gear shift is an upshift.

* * * * *